United States Patent
Christensen et al.

(10) Patent No.: US 11,912,151 B2
(45) Date of Patent: Feb. 27, 2024

(54) RECONFIGURABLE ELECTRIC VEHICLE CHASSIS

(71) Applicant: Robert Bosch GmbH, Stuttgart (DE)

(72) Inventors: John Christensen, Elk Grove, CA (US); Reinhardt Klein, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 530 days.

(21) Appl. No.: 16/944,619

(22) Filed: Jul. 31, 2020

(65) Prior Publication Data
US 2022/0032806 A1    Feb. 3, 2022

(51) Int. Cl.
| | |
|---|---|
| *B60L 53/66* | (2019.01) |
| *B60L 53/16* | (2019.01) |
| *B60L 53/53* | (2019.01) |
| *B60L 50/60* | (2019.01) |
| *B60L 53/62* | (2019.01) |
| *B60L 53/30* | (2019.01) |
| *B60L 55/00* | (2019.01) |

(52) U.S. Cl.
CPC .............. *B60L 53/66* (2019.02); *B60L 50/60* (2019.02); *B60L 53/16* (2019.02); *B60L 53/305* (2019.02); *B60L 53/53* (2019.02); *B60L 53/62* (2019.02); *B60L 55/00* (2019.02)

(58) Field of Classification Search
CPC .......... B60L 53/66; B60L 50/60; B60L 53/16; B60L 53/305; B60L 53/53; B60L 53/62; B60L 55/00; B60L 58/10; B60L 53/57; B60K 2001/0405; B60K 1/04; Y02E 60/00; Y02T 10/70; Y02T 10/7072; Y02T 90/12; Y02T 90/14; Y02T 90/16; Y04S 10/126; B62D 21/00
See application file for complete search history.

(56) References Cited

U.S. PATENT DOCUMENTS

| | | | |
|---|---|---|---|
| 4,636,178 A | 1/1987 | Oda et al. | |
| 7,520,355 B2 | 4/2009 | Chaney | |
| 7,550,861 B2 * | 6/2009 | Oyobe | B60L 1/006 290/40 C |
| 8,509,976 B2 * | 8/2013 | Kempton | B60L 53/305 320/109 |
| 2018/0105062 A1 | 4/2018 | Fees et al. | |
| 2021/0057694 A1 * | 2/2021 | Zeiler | H01M 10/655 |
| 2021/0252987 A1 * | 8/2021 | Brenninger | B60K 17/356 |

\* cited by examiner

*Primary Examiner* — Elim Ortiz
(74) *Attorney, Agent, or Firm* — Brooks Kushman P.C.

(57) ABSTRACT

An electric vehicle (EV) chassis is disclosed that may be a modular platform flexible as a basis for numerous other EV platforms. It is contemplated that the entire electric drivetrain (i.e., powertrain, wheels, steering) may be supplied to an automotive original equipment manufacturer (OEM). The OEM may use the EV chassis for integration within a representative passenger compartment. The chassis may also be reconfigurable with the modularity at various levels that include the energy storage system, the entire chassis system, or any level in-between. The chassis may further be designed to allow connection of multiple modules to enable a larger scale energy storage that may be provided to homes, buildings, or the electric power grid.

20 Claims, 7 Drawing Sheets

RECONFIGURABLE ELECTRIC VEHICLE CHASSIS

TECHNICAL FIELD

The present disclosure relates to a reconfigurable electric drivetrain for use by an electric vehicle when driven or as a stationary energy storage device.

BACKGROUND

Over the past decade, electric vehicles (EV) have become a more significant portion of the overall market of vehicles on the road. And some of the older EVs currently on the road are now nearing the end of their service life. One issue with retired EVs pertains to how to dispose and recycle various components like the high-voltage (HV) battery packs.

SUMMARY

An electric vehicle (EV) chassis system and method is disclosed as comprising a high-voltage battery, at least one power port (i.e., module-to-module port or M2M port) located on the EV chassis, the at least one power port being electrically connected with the high-voltage battery, and at least one communication port located on the EV chassis. The at least one power port may be operable to be electrically connected to an external power port located on a second EV chassis. The external power port may also be electrically connected to an external high-voltage battery within the second EV chassis. The at least one communication port may be operable to transmit data with an external communication port located on the second EV chassis. A controller (that may be part of a Battery Management System) may be operable to control electrical energy transferred between the at least one power port and the external power port responsive to the at least one power port being connected to the external power port. The controller may also be operable to transmit the data between the at least one communication port and the external communication port responsive to the at least one communication port being connected to the external communication port.

It is contemplated that the at least one power port may be designed as a male connector or female receptacle. The EV chassis includes at least one switch and the second EV chassis includes an external switch. The controller may then operate the at least one switch and the external switch to create a series connection between the high-voltage battery of the EV chassis and the external high-voltage battery responsive to the at least one power port being connected to the external power port. The controller may also operate the at least one switch and the external switch to bypass electrical energy from being transferred between the high-voltage battery of the EV chassis and the external high-voltage battery responsive to the at least one power port being connected to the external power port. Lastly, the controller may operate the switch and the external switch to produce an alternating current (AC) energy output responsive to the at least one power port being connected to the external power port.

The EV chassis may also include a support sheet that includes a support power port and a support communication port. A lower portion of the support sheet may be operable to be mechanically fastened to the EV chassis. The support power port and the support communication port may also be electrically connected to the at least one power port and the at least one communication port. Also, an upper portion of the support sheet may be mechanically fastened to the second EV chassis. The support power port and the support communication port may also be electrically connected to the external power port and the external communication port.

The controller may further be operable to measure at least one operating characteristic (e.g., SOC, SOH, discharge, etc.) of the high-voltage battery and the external high-voltage battery. Based on the operating characteristics, the controller may control operation of the high-voltage battery and the external high-voltage battery, transmit the operating characteristics to a remote server, or generate a warning when the at least one operating characteristic exceed a predefined threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Over the past decade, electric vehicles (EV) have become a more significant portion of the overall market of vehicles on the road. And some of the older EVs currently on the road are now nearing the end of their service life. One issue with retired EVs pertains to how to dispose and recycle various components like the high-voltage (HV) battery packs. It is contemplated that EVs could be designed so that the repurpose HV batteries could be re-purposed for second-life applications like stationary storage that could provide energy to the energy grid, homes, or business.

However, today most HV batteries from retired EVs are not recycled due to complications or cost. Indeed, it is generally understood that the average cost of repurposing second-life batteries may range from $75-100/kWh. This price range for repurposing batteries for second-life applications is due to the cost associated with dismantling, testing, battery transportation, and battery acquisition. Another potential driver challenging second-life value may relate to the steady decline in prices for new battery packs. The decrease in new battery pack prices is generally driven by improved economies of scale, advances in battery cell chemistry, and subsequent battery pack energy density.

Unfortunately, these factors generally render second-life applications cost prohibitive when compared to the price of providing a new battery pack. It is therefore contemplated that certain technological barriers may need to be overcome to make the second-life value a viable potential as opposed to recycling or disposal. For instance, second-life battery applications and volume might increase if repurposing was considered and accounted for during the initial battery design. It is even estimated that, if considered during the initial design, second-life batteries could cost as little as $20/kWh.

It is therefore contemplated that a system and method may be needed to reduce the cost of repurposing batteries by designing them within an EV platform. The system and method should attempt to provide a low-cost transportation and reassembly for second-life battery packs, while possibly relying upon sophisticated battery management system (BMS) algorithms to accurately estimate a physical state of health of the battery (and component cells). It is contemplated that such a system and method may enable reliable valuation of the second-life battery pack with the post-initial application(s) in mind.

It is also contemplated that the second-life battery pack may provide a business model where an EV "rolling chassis"—that includes the battery pack—may be leased (e.g., monthly fee and/or according to usage, such as kWh throughput or miles driven) to automotive OEMs, business owners, or fleet operators over the course of the first-life mobility application. At the end of the EV lease, the passenger/cargo compartment of the vehicle might be removed and the rolling chassis (that includes the HV battery pack) might be repurposed for the energy storage system of a second application. The newly second-life energy storage system (i.e., second application) might be sold to another party (e.g., a utility or homeowner) or second-life energy storage system might continue to be owned and maintained by the rolling chassis manufacturer. For instance, the rolling chassis manufacturer might provide a service of electricity delivery and storage to a utility or building owner for a fee (subscription and/or at a price per kWh for storage and delivery).

Figure 1:
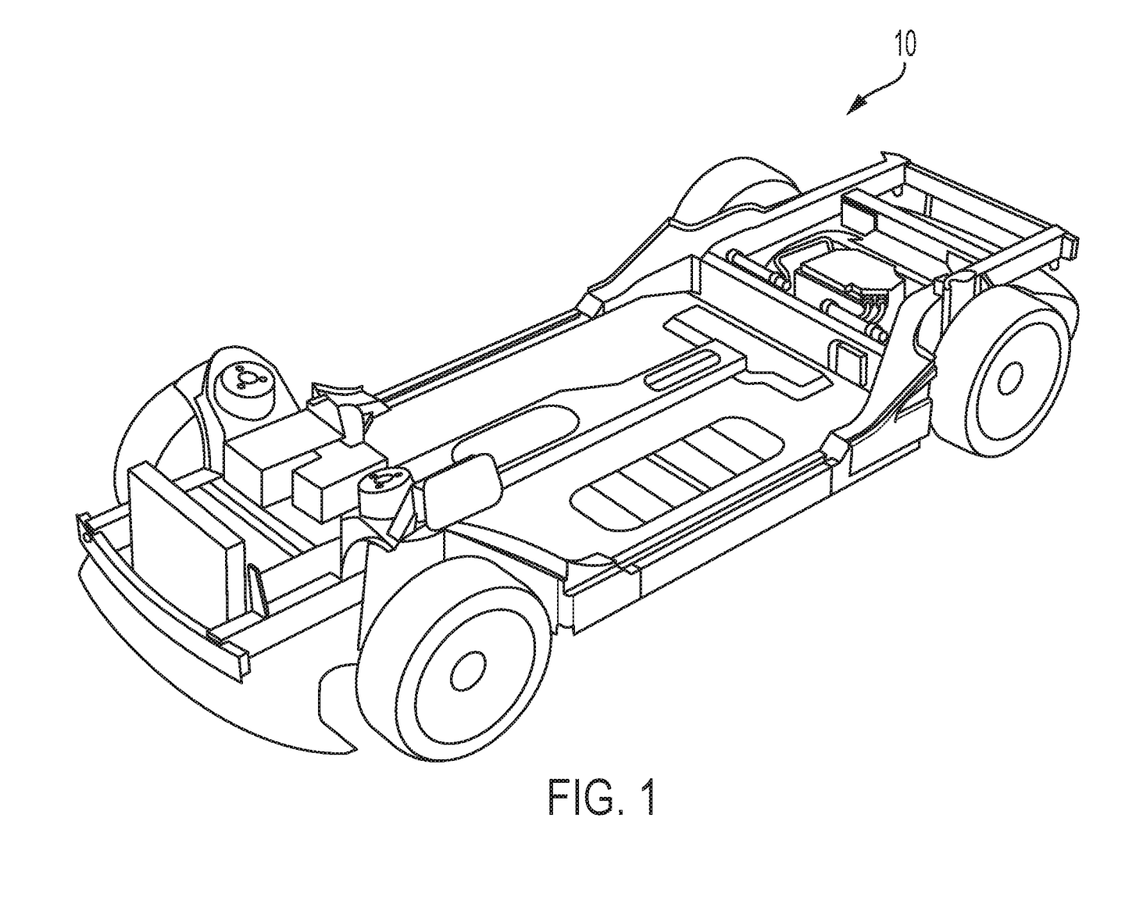
FIG. 1 illustrates an exemplary electrical vehicle (EV) chassis.

For instance, FIG. 1 illustrates an EV chassis 10 or "rolling chassis" that may be a drivable modular platform that is flexible as a basis for numerous other EV platforms. It is contemplated that the entire electric drivetrain (i.e., powertrain, wheels, steering) may be supplied to an automotive original equipment manufacturer (OEM). In turn, the OEM may use the EV chassis 10 for integration within a representative passenger compartment that is situated upon the EV chassis 10. It is contemplated that the chassis 10 may be reconfigurable with the modularity at various levels that include the energy storage system, the entire chassis system, or any level in-between. It is further contemplated that the chassis 10 may be designed to allow connection of multiple modules to enable a larger scale energy storage that may be provided to homes, buildings, or the electric power grid.

Figure 2:
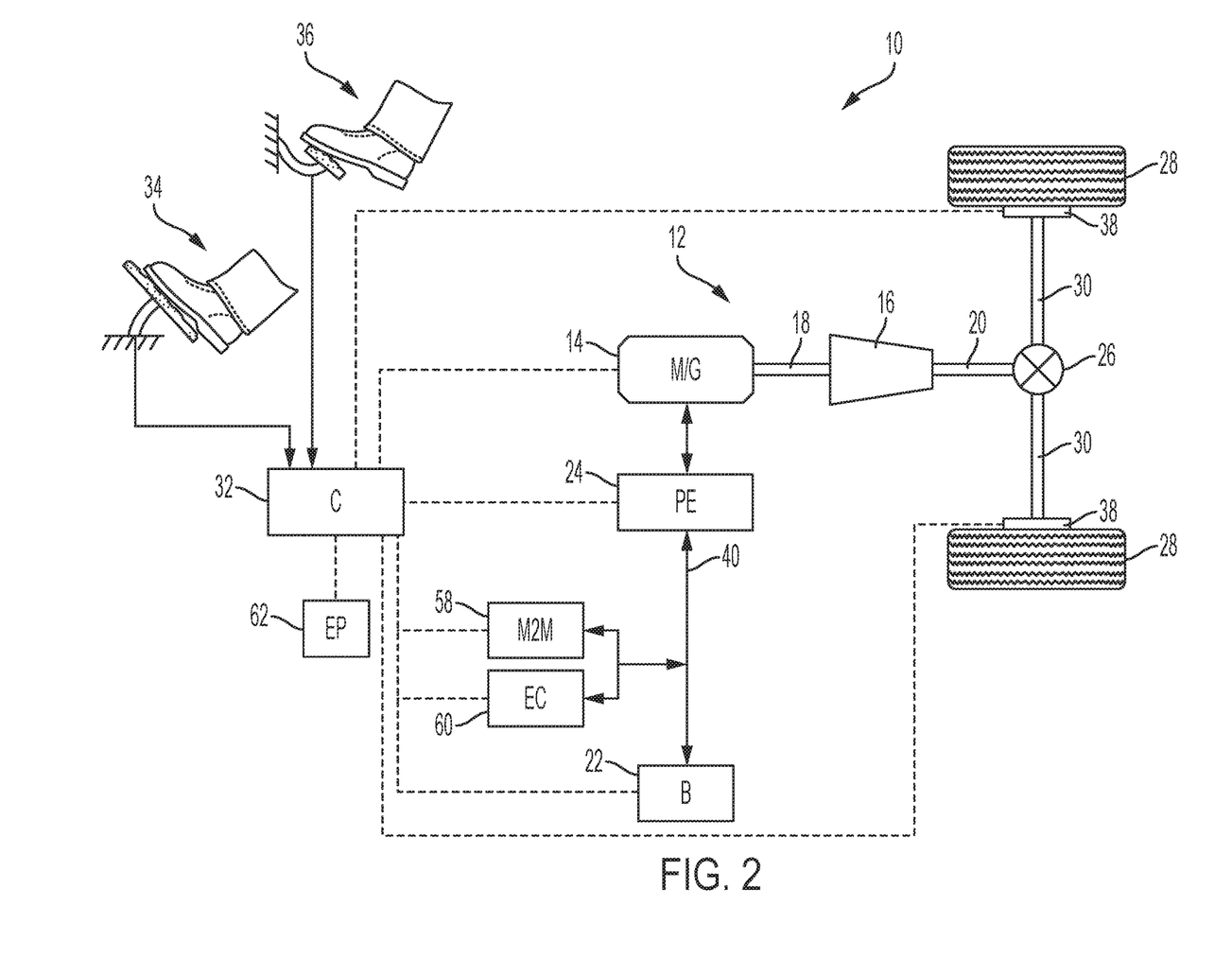
FIG. 2 is an exemplary schematic of the EV chassis.

FIG. 2 illustrates a schematic diagram of an chassis 10 that may be supplied to the OEM. The chassis 10 may be used as a drive platform for an electric vehicle (EV) that may include a passenger cabin operable to be driven on a road. However, it is also contemplated that chassis 10 may be operable as a stationary energy storage unit for providing electric power to one or more homes, buildings, or for power regulation to an electric power grid. FIG. 2 illustrates some representative relationships among the components that may be included or attachable to the chassis 10. Physical placement and orientation of the components within the chassis 10 may vary.

For instance, the chassis 10 may include a powertrain 12 having an electric machine such as an M/G 14 (i.e., electric motor/generator) that drives a transmission 16 (or gearbox). More specifically, the M/G 14 may be rotatably connected to an input shaft 18 of the transmission 16. The transmission 16 may be operable for being controlled in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission.

An associated battery pack 22 may be included within the chassis 10. The battery pack 22 may be a high-voltage battery (i.e., EV traction battery) having one or more cells that operably are combined to deliver electrical power to or receive electrical power from the M/G 14. The battery pack 22 may be included within a battery management system (BMS) that is operable for many aspects related to the battery 23 or electrical aspects of the chassis 10. It is also contemplated that the battery pack 22 may include other power electronics (e.g., switches) not illustrated by FIG. 2. Depending upon the type of chassis 10, the size of the battery 22 may vary and be sized to provide 400-Volts or 800-Volts. Battery 22 may also be designed using a collection of electrochemical cells (e.g., LI-ion cells) that are configured in series and/or parallel to store and provide electrical energy.

The M/G 14 may be a drive source for the chassis 10 that is configured to propel the chassis 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three-phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the output shaft 20 and the input shaft 18. The transmission 16 may be operable to automatically shift from one ratio to another based on various vehicle and ambient operating conditions by an associated controller, such as a powertrain control unit (PCU). Power and torque from the M/G 14 may then be delivered to and received by transmission 16. The transmission 16 then provides powertrain output power and torque to output shaft 20.

As shown in the representative embodiment of FIG. 1, the output shaft 20 may also be connected to a differential 26. The differential 26 drives a pair of wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the operating mode or condition.

FIG. 2 illustrates an associated controller 32 that may be part of a battery management system (BMS) and/or a powertrain control unit (PCU). While illustrated as one controller, the controller 32 may be representative of a larger control system and may be in communication with other controllers throughout the vehicle 10 (e.g., vehicle system controller or "VSC"). It should therefore be understood that the controller 32 and one or more other controllers can collectively be referred to as a "controller" that controls various actuators in response to signals from various sensors to control functions such as operating the M/G 14 to provide wheel torque or charge the battery 22.

Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 may communicate with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process signals before being supplied to the CPU.

As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16). Although not explicitly illustrated, those of ordinary skill in the art will recognize various functions or components that may be controlled by controller 32 within each of the subsystems identified above.

Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature, transmission gear, ratio, or mode, transmission oil temperature (TOT), transmission input and output speed, slowing or shift mode (MDE) for example. It is also contemplated that if part of a larger BMS, the controller 32 may also be operable to manage the operating parameters of the battery 22, or electrical system. Such representative functions may include monitoring battery temperature, voltage, current, battery state of health, State of Charge (SOC), battery discharge, battery cell balancing, discharge control of the battery 23, battery reporting, and authenticating the battery 23.

Control logic or functions performed by controller 32 may include various control strategies and/or logic that may be implemented using one or more processing strategies such as event-driven, interrupt-driven, multi-tasking, multi-threading, and the like. As such, various steps or functions may be performed in sequence or in parallel. Although not explicitly illustrated, one of ordinary skill in the art will recognize that disclosed algorithm or functions described within may be repeatedly performed depending upon the particular strategy being used. Similarly, the order of processing is not necessarily required to achieve the features and advantages described within this specification.

The control logic may be implemented primarily in software executed by a microprocessor-based vehicle and/or powertrain controller, such as controller 32. Of course, the control logic may be implemented in software, hardware, or a combination of software and hardware in one or more controllers depending upon the application. When implemented in software, the control logic may be provided in one or more computer-readable storage devices or media having stored data representing code or instructions executed by a computer to control the vehicle or its subsystems. The computer-readable storage devices or media may include one or more known physical devices which utilize electric, magnetic, and/or optical storage to keep executable instructions and associated calibration information, operating variables, and the like.

When chassis 10 is used as a full EV, an accelerator pedal 34 may be included to provide a demanded torque, power, or drive command to the powertrain 12 (or more specifically M/G 14) to propel the vehicle. In general, depressing and releasing the accelerator pedal 34 may generate an accelerator pedal position signal that may be interpreted by the controller 32 as a demand for increased power or decreased power, respectively. A brake pedal 36 may also be included and used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

The chassis 10 may also include an external charging port 60 that is connected to the wiring which may be a high-voltage DC bus. The charging port 60 may be designed to receive AC energy compatible from an external source (e.g., 120 VAC and/or 240 VAC outlets) and convert the AC energy to a DC energy for charging the battery 22. It is also contemplated that charging port 60 may be designed as part of an Electric Vehicle Supply Equipment (EVSE) system.

Chassis 10 may also include a module-to-module (M2M) port 58 and an electronics port 62. It is contemplated that the M2M port 58 may be electrically connected to receive and provide charging energy to battery 22. The electronics port 62 may be operably connected to communicate with the BSM (i.e., controller 32) and other modules included within chassis 10. M2M port 58 may also be in communication with BMS (i.e., controller 32) to control charging aspects of the battery.

As explained further below, M2M port 58 and electronics port 62 may be designed so that chassis 10 can be operably stacked and connected to other chassis. Or M2M port 58 and electronics port 62 may be designed to be part of an energy storage "module" that is removable from the chassis 10. When removed from chassis 10, the module may also include the battery 22, controller 32, BMS, and associated switches and sensors. The removed module may then be operably stacked upon additional modules.

The M2M port 58 and/or electronics port 62 may also operably facilitate mechanical connections between two chassis or modules when stacked. The mechanical connections may interconnect the top portion of one chassis/module to a bottom portion of a second chassis/module to facilitate a rigid connection when the chassis/modules are stacked together. It is contemplated that the M2M port 58 and/or electronics port 62 connectors may include an actuated "lock" (e.g., twist lock plug, sliding bolt) that may be actuated remotely and/or automatically. The M2M port 58 and/or electronics port 62 connections may also be operable to reverse the stacking process. In other words, the M2M port 58 and/or electronics port 62 connections are designed to unlock and allow chassis/modules to be disconnected away from each other. However, it is also contemplated that the M2M port 58 may not be mechanically connected but may instead provide inductive charging between the two or more chassis/modules that are stacked together.

Lastly, it is also contemplated that the M2M port 58 may be utilized and connected in an EV to provide electrical power from the battery 22 to an attached passenger/cargo compartment. The power supplied from the battery 22 via the M2M port 58 may be in addition to electrical power supplied by a low-voltage bus (i.e., 12-V or 48-V bus).

Again, FIG. 2 represents components that may be included within and/or upon the chassis for the mobility application of an EV. As discussed above, the chassis 10 may include an electric drive including an M/G 14, transmission 16, and power electronics. But, chassis 10 may include more or less components than shown by FIG. 2. Chassis 10 may also include a mechanical connection that allows a passenger/cargo compartment to be attached. For instance, a quick release mechanical connection may allow the chassis 10 to be securely connected to the passenger/cargo compartment. It is contemplated that such mechanical connections may include sliding bolts along the frame of the body that lock into place and can only be unlocked with an electronic or mechanical key. Usage of a mechanical connection may facilitate removal of the passenger/cargo compartment from the chassis 10 at the end of the service life of the EV. However, it is also contemplated that chassis 10 may be welded to the passenger/cargo compartment to provide a more permanent connection. Welding may be a preferable option when the energy storage system (i.e., battery pack 22 including BMS) can be easily removed from the chassis as a reconfigurable module.

It is contemplated that the chassis 10 may be used in a stationary storage application, where the energy storage system (i.e., battery pack 22, BMS, and associated electric components) or chassis 10 have quick connect ports located on an upper and lower portion. For instance, chassis 10 may include electrical connections so that additional chassis may be aligned, and lowered (i.e., stacked) upon each other. The chassis/modules may be stacked with mating connections. When interconnected, a first M2M port should be male connection and the second M2M port should be a female connection.

Figure 3:
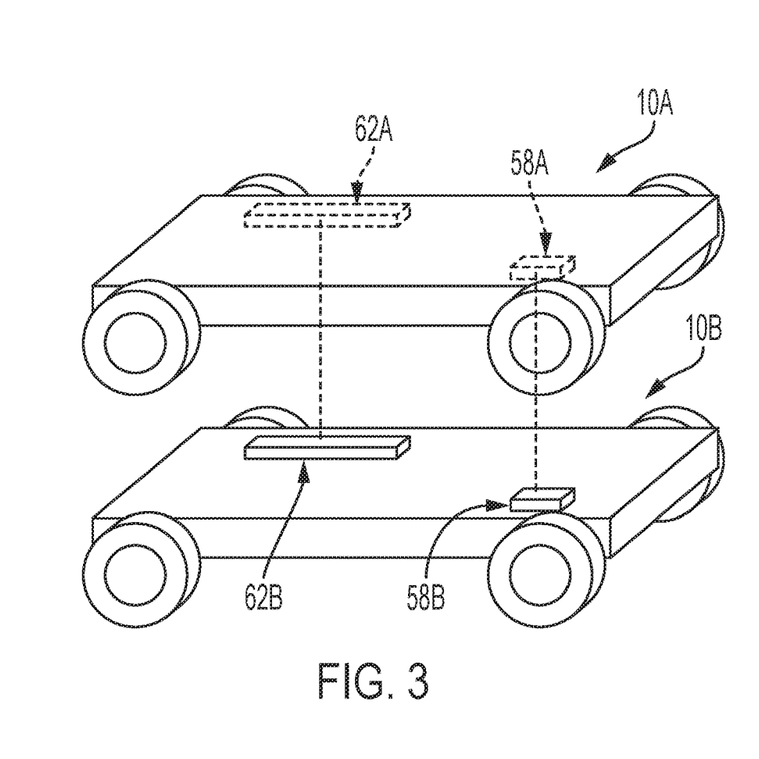
FIG. 3 illustrates a first EV chassis being stacked upon a second EV chassis.

For instance, FIG. 3 illustrates a first chassis 10A and a second chassis 10B where the passenger/cargo compartment have been removed. FIG. 3 also illustrates the energy storage system (i.e., battery pack 22A & 22B, controller 32A & 22B (i.e., BMS), M2M port 58A & 58B, and electronics port 62A & 62B) may still be included within chassis 10A and 10B, respectively. As shown, M2M port 58A and electronics port 62A may be located on a lower or bottom portion of chassis 10A. And, M2M port 58B and electronics port 62B may be located on an upper or top portion of chassis 10B. It is contemplated that M2M ports 58A and 58B may allow electrical power to be connected between battery pack 22A and battery pack 22B. Once both chassis 10A, 10B are electrically connected the combined power of both batteries may be combined in a parallel or series fashion. And electronics port 62A and 62B allow communication (i.e., data) to pass between the BMS of chassis 10A and the BMS of chassis 10B. Again, the M2M ports 58A and 58B and the electronics port 62A and 62B also provide mechanical connections allowing the first chassis 10A to be lowered into place (i.e., stacked) on top of the second chassis 10B.

It is contemplated that chassis 10A may further have M2M ports and communication ports located on the upper or top portion of 10A. The M2M ports and communication ports on the top portion could then be used for connection to a third chassis. Likewise, chassis 10B may further have M2M ports and communication ports on the lower or bottom portion of chassis 10B. These M2M ports and communication ports on the bottom portion of chassis 10B could then be used for connection to a fourth chassis. It is contemplated such connections could continue so that multiple chassis may be connected (i.e., stacked) together to form a larger energy storage system.

Figure 4:
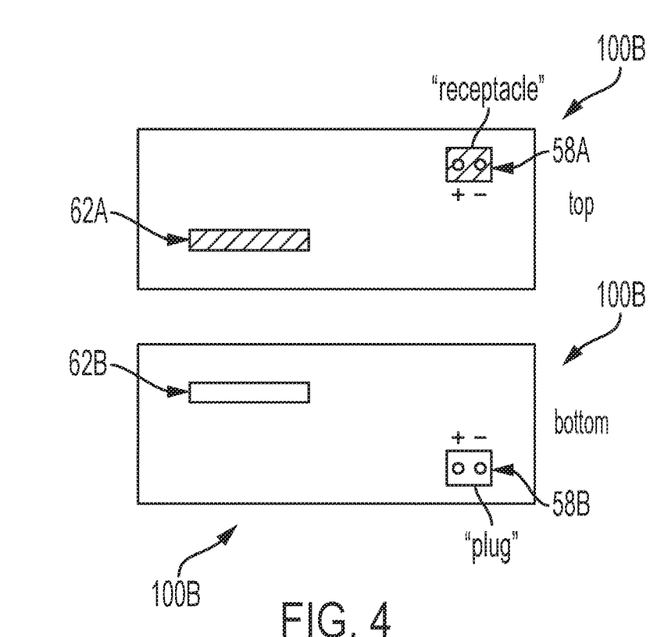
FIG. 4 illustrates a first module being stacked upon a second module.

Alternatively, FIG. 4 illustrates a first energy storage system 100A and a second energy storage system 100B that have been removed from two separate chassis (e.g., first chassis 10A and second chassis 10B). Both modules 100A, 100B may include many elements discussed with respect to FIGS. 2 and 3. For instance, battery module 100A may include a battery pack 22A, M2M port 58A, electronics port 62A, and a BMS. Likewise, battery module 100B may include a battery pack 22B, M2M port 58B, electronics port 62B, and a BMS.

As illustrated, a top portion of module 100A is shown as including a M2M port 58A with a receptacle (i.e., female adapter) and a bottom portion of module 100B is shown as including a M2M port 58B with a plug (i.e., male adapter). The bottom portion of module 100A also includes a communication port 62A and the bottom portion of module 100B includes a communication port 62B. Again, M2M port 58A and 58B may be electrically connected so that the combined power of modules 100A and 100B may be combined in a parallel or series fashion. And electronics port 62A and 62B allow communication (i.e., data) to pass between the BMS of module 100A and the BMS of module 100B. Lastly, the M2M ports 58A and 58B and the electronics port 62A and 62B also provide mechanical connections allowing the first module 100A to be lowered into place (i.e., stacked) on top of the second module 100B.

Figure 5A:
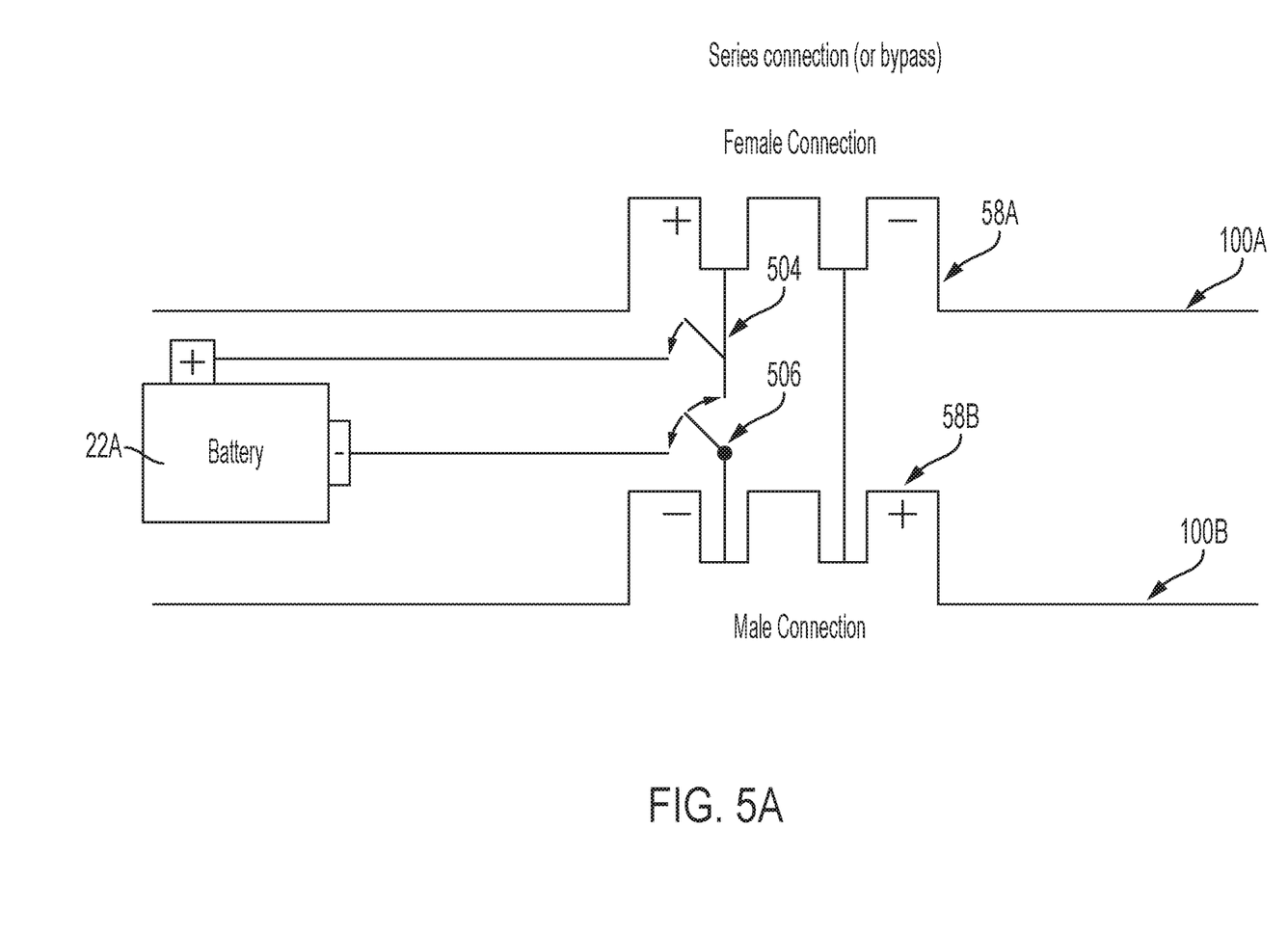
FIG. 5A illustrates a male and female module-to-module port connection.

FIG. 5A further illustrates a first M2M port 58A and second M2M port 58B that may be used within modules 100A, 100B. However, FIG. 5 is also illustrative of the M2M ports that may be used by chassis 10A, 10B shown in FIG. 3. As shown, the M2M port 58A protrudes inward away from the surface of module 100A to form a female type electrical connection. The M2M port 58B protrudes above the surface of the module 100B to form a male type electrical connection. It is contemplated that the female M2M port 58A is designed to mate or fit with the male M2M port 58B.

Switch 504 and switch 506 may be operably actuated and controlled by BMS to connect the battery 22A of the module 100A in series with the module 100B. However, switches 504, 506 may also be controlled to bypass the battery 22A of module 100A in case it is depleted or fully charged (i.e., for module balancing). Switches 504, 506 may also be controlled to bypass the battery 22A of module 100A when BMS is operating a sophisticated charging/discharging algorithm. For instance, BMS may control switches 504, 506 during an "AC charging" algorithm where modules 100A, 100B may be rapidly switched into/out of the circuit such that the stack has a discretized sinusoidal function. Such an AC charging algorithm may be advantageous when the system is connected with an AC power grid. Switches 504, 506 may also be controlled to bypass the battery 22A when module 100A is operating as an EV vehicle with an attached passenger compartment/cab.

Figure 5B:
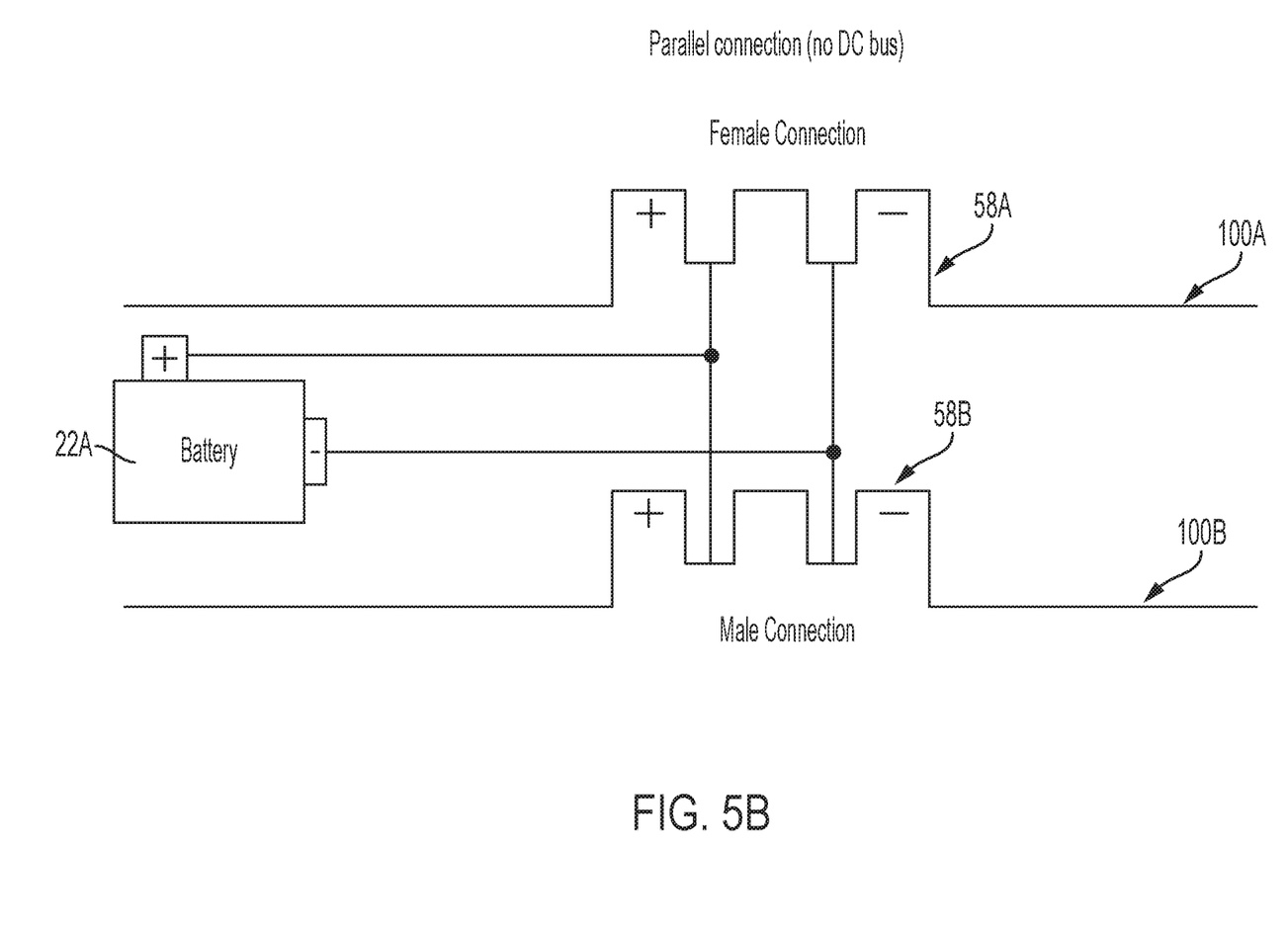
FIG. 5B illustrates an alternative male and female module-to-module port connection.

FIG. 5B illustrates an alternative embodiment where the first M2M port 58A and the second M2M port 58B may be modified to provide a parallel electrical connection. It is contemplated that the parallel connection may be completed as a direct connection or by usage of the high-voltage DC bus. It is also contemplated that an intermediate resistor (not shown) may be used when using a direct parallel connection to limit the current flow between battery packs of each chassis.

Again, the M2M port 58A may protrude inward away from the surface of module 100A to form a female type electrical connection. The M2M port 58B may protrude above the surface of module 100B to form a male type electrical connection. It is contemplated that the female M2M port 58A may be designed to mate or fit with the male M2M port 58B.

However, unlike the series connection illustrated by FIG. 5A, the polarity of the voltage connections between the M2M port 58A and the M2M port 58B may be aligned to provide the parallel connection between module 100A and module 100B. And the battery 22A of the module 100A may therefore provide the direct parallel connection with module 100B. The direct parallel connection may therefore be accomplished without the usage of the high-voltage DC bus. However, it is also contemplated that if the high-voltage DC bus is used when providing a direct parallel connection, the charging port 60 may be used for connecting the high-voltage DC bus.

Figure 7A:
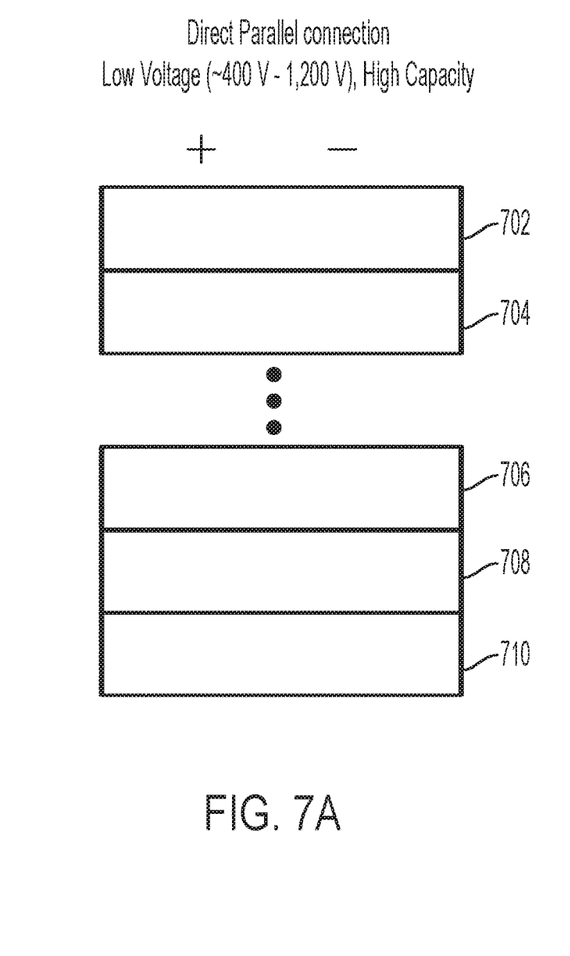
FIG. 7A illustrates a plurality of EV chassis being stacked in a direct parallel connection.
Figure 7B:
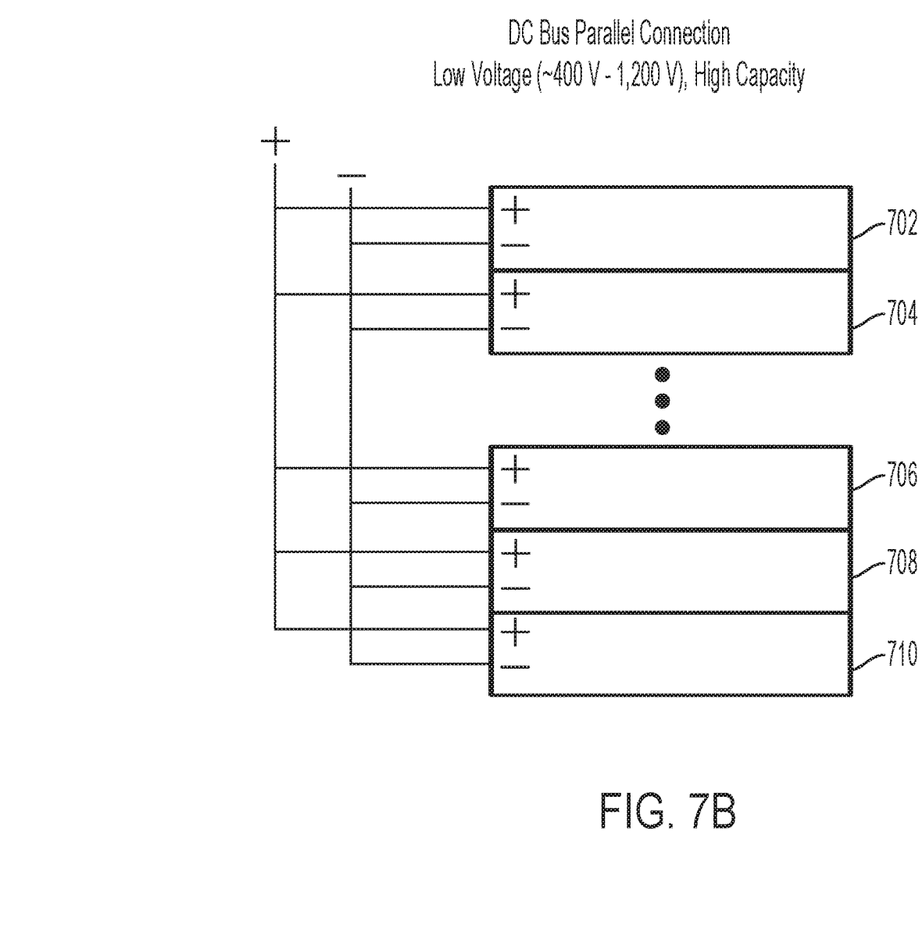
FIG. 7B illustrates a plurality of EV chassis being arranged using a DC Bus parallel connection.

For instance, FIG. 7A is an illustrative example of a plurality of individual modules 702-710 (i.e., chassis) stacked using a direct parallel connection. The direct parallel connection of modules 702-710 may be operable to provide a high capacity, voltage level between 400 Volts and 1,200 Volts. Alternatively, FIG. 7B illustrates how a parallel connection between modules 702-710 may be provided using the high voltage DC bus. Again, the charging port 60 included within each module (e.g., chassis 10) may be used to provide the connection between modules 702-710.

It is also contemplated that additional switches may be included within or between modules 702-710, the M2M connections (e.g., M2M port 58A and 58B) may enable both parallel and series connections between each adjacent module or the entire group of modules 702-710. However, it is also contemplated that the high voltage DC bus connection may be used to provide the series connection between various modules.

Figure 6:
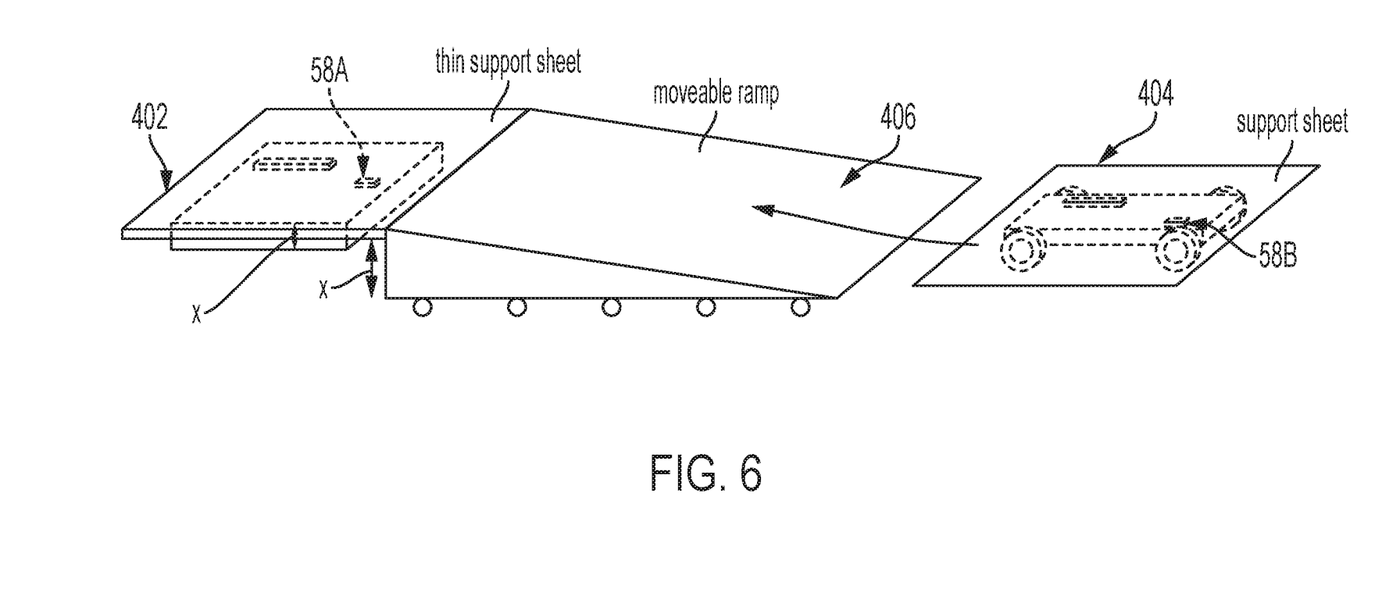
FIG. 6 is an illustrative example of a first EV chassis being stacked upon a second EV chassis.

FIG. 6 is an exemplary illustration for how to chassis (e.g., chassis 10A and chassis 10B) may be stacked upon each other. However, it is contemplated that the stacking process described may also be implemented using energy storage systems 100A and 100B illustrated by FIG. 4. As shown, the stacking process may include a relatively thin, but structurally resilient, supporting sheet 402 upon chassis 10A and supporting sheet 404 upon chassis 10B.

It is contemplated that supporting sheets 402 and 404 may have communication and electrical connections like the module to which it is connected. For instance, supporting sheet 402 may include connecting ports (e.g., female or male ports) upon one surface that interconnect with M2M port 58A and communication port 62A of chassis 10A. Likewise, supporting sheet 404 may include connecting ports (e.g., female or male ports) upon one surface that interconnect with M2M port 58*b* and connection port 62B of chassis 10B. The electrical cabling, connections, and switches located within each support sheet (e.g., sheet 402, 404) may also be designed so that chassis or modules may be stacked upon each other in series, parallel, or a combined series-parallel electrical configuration. It is contemplated that supporting sheets 402, 404 may also include one or more latching mechanisms (not shown) that mechanically connect to chassis 10A and 10B. It is contemplated that latching mechanisms may be designed to ensure supporting sheets 402, 404 remain securely locked to chassis 10A and 10B.

A ramp 406 may also be included that is moveable (e.g., with a series of wheels or rollers) and adjustable in terms of height so that the inclination grade allows one chassis to be rolled up and positioned upon another fixed chassis. For instance, the ramp 406 may be adjusted so that chassis 10B may be rolled up the ramp and positioned upon supporting sheet 402. It is contemplated that supporting sheet 402 may provide a support for the wheels of the chassis 10B beyond the width of the chassis 10A. It is further contemplated that sheet 402 may include contours or positioning stops that provide accurate alignment of the chassis 10B upon chassis 10A. It is also contemplated that chassis 10A and chassis 10B may include locating sensors (e.g., optical) operable for locating markings upon an underlying support sheet to accurately align one chassis upon another. For instance, sheet 402 may include markings and chassis 10B may include an optical sensor. When optical sensor detects the marking upon sheet 402, the controller 32B may lock the wheels so that chassis 10B is not able to continue to be moved.

Once accurately aligned, chassis 10B may then be lowered on top of support sheet 402 and locked into place. The support sheet 402 may provide the actuation by lowering the chassis into place. For instance, support sheet 402 may include adjustable wings operable to adjust downward relative to the part of support sheet 404. In stationary mode, stacked chassis/modules may then be mechanically and electrically connected by support sheet 402 to chassis 10B. It is also contemplated that one or more external cables may be used to electrically connect chassis 10A and 10B in series and/or parallel.

It is then contemplated that the wheels (and additional components) of chassis 10B may be removed. Additional support components may also be included to span from a lower support sheet (i.e., support sheet 402) to an upper support sheet (i.e., support sheet 404) for supporting a tall stack of modules. In other words, the additional support components may be included so that numerous chassis or modules may be stacked onto each other while alleviating the weight born by the chassis or modules themselves. The chassis and modules may also be designed to include support components that provide load-bearing operability to support the weight of the stack themselves.

While FIG. 6 illustrates ramp 406 for positioning chassis 10B upon chassis 10A, it is contemplated other systems may be used. For instance, an elevator or hoist may be used in assembling one chassis upon another. Or, spiral ramps, such as those used in parking structures, may be used. It is also contemplated that the assembly process can be automated or semi-automated utilizing autonomous or remote-control steering and driving of one chassis (e.g., chassis 10B) at a stationary storage system site.

For instance, chassis 10B may still include a passenger compartment and may be driven or autonomously transported to a stationary storage system site for assembly onto one or more chassis. Or, the passenger compartment may have already been removed (e.g., at a recycling or repurposing facility) and chassis 10B may be transported using a hauling or cargo truck. An external crane may also be used for lifting chassis/modules and lowering them onto other chassis/modules (e.g., loading chassis 10B onto chassis 10A). A built-in actuation system may also be used to achieve similar results without the need for an external crane.

It is further contemplated that the process described with respect to FIG. 6 may also be reversible such that a stationary energy storage system can be broken back down and each chassis/module (e.g., chassis 10B) may be reconfigured as rolling chassis with wheels. The chassis 10B can then be again repurposed as an EV or chassis 10B can be repositioned to a new location for reassembly as a stationary energy storage system with other chassis/modules. In this way, it is contemplated that a "stationary energy storage" system may be a semi-mobile, reconfigurable energy storage system. The semi-mobile stationary energy storage system may therefore enable geographic redistribution of storage capacity according to changing demand and changing capability of the individual energy storage systems.

For instance, system "A" may reside at location "A" and system "B" may reside at location "B." System A and system B may both be operable to provide energy storage capacity of 1 MWh. If over time the demand in location A may drop to 250 kWh while the demand at location B may increase to 1.25 MWh. Also, the capacity of the energy storage systems may drop by 25% at both locations. Based on this example, it would be possible that ⅔ of the chassis/modules stacked at location A could be converted back into rolling chassis and transported to location B to meet the increasing energy demand. Such repurposing would allow additional chassis/modules to be repurposed without bringing in additional energy storage systems, which may be utilized inefficiently when combined with "older," less healthy modules.

Each rolling chassis 10A, 10B may also be used as a stand-alone semi-mobile energy storage system. In some embodiments, the chassis 10A, 10B may be stacked to increase the energy storage capacity (i.e., range) for mobile applications.

It is also contemplated that repurposing of energy storage (i.e., chassis 10) for second-life applications may be based on an accurate determination of the residual value of the energy storage system. It may therefore require an estimate of the state of health of the battery stack and/or the battery cells within. The BMS may be operable to measure the battery stack 22 state of health beyond conventional metrics of capacity and DC resistance to encompass a broader aspect of the changing physical parameters of the battery stack 22 (or battery cell) including performance at a given point in time.

For instance, some representative parameters may include the residual capacity in the cathode and that in the anode, the amount of cyclable lithium, the resistance of interfacial films between electrode materials and electrolyte, the conductivity of the electrolyte, etc. Many of these parameters can be estimated on board the vehicle with measurable inputs available to the BMS and without excessive memory usage or processing power. Other parameters may require more sophisticated models and estimation algorithms that can run offline (e.g. on occasion throughout the first service life or upon decommissioning of the EV at the end of its service life).

It is also contemplated that the SOH may also be determined by the BMS without additional measurements, or with minimal testing at the end of the first service life. Once the SOH of the battery is determined by the BMS with a certain degree of accuracy, the performance of the battery stack 22 over a "second life" period of time can be predicted. The physical model of the battery stack 22 may be determined for one or more scenarios that encompass anticipated use cases and operating conditions. Hence, the residual utility of the battery stack 22 can be assessed in case it is to be sold, or the benefit/cost ratio can be determined with a level of accuracy greater than if the physical SOH were not well known.

As disclosed above, two applications have been disclosed for a chassis or module. First, the chassis may be part of an EV for mobile applications. Next, the chassis may be repurposed (possibly after the life-span of the EV is complete). The repurposed chassis may include removal of the passenger compartment (i.e., converted to an energy storage system) and/or energy storage components (i.e., battery, BMS, switches, necessary power electronics). The modified chassis (e.g., chassis 10A, 10B) or module (e.g., module 100A, 100B) may be connected to additional chassis to expand the energy storage capacity of the resulting structure. Alternatively, with additional modification chassis may be stacked and connected to provide expandable energy storage for the second application. As such, the stationary energy storage may provide energy to homes, buildings, communities, or power regulation for the electrical grid.

The disclosed BMS may be operable to actively monitor operating parameters of the battery 22 (e.g., voltage, current, temperature, etc.) and control operating characteristics of the battery 22 (e.g., charging speed) and/or its cells. Various power electronics may also be used to connect the battery to an EV charger (e.g., Electric Vehicle Supply Equipment control) for charging the battery 22. The power electronics may also be operable to modulate the voltage and voltage frequency as required depending upon a given application.

The BMS may also be operable to control the battery independently (e.g., for vehicle energy management) or as a "slave" to a "master" BMS residing on another chassis/module when used within an expanded system. Such "master"/"slave" commands may be communicated using communication port (e.g., communication port 62A, 62B). The "master" BMS may operate to manage use of each individual chassis/module as well as charge and discharge of the overall stacked system from the building or grid. The "master" BMS may further estimate the physical state of all the battery stacks and component cells (i.e., state of health), in real time on board the vehicle and/or utilizing more sophisticated/computationally expensive models offline (e.g., remote or cloud processing).

Again, quick connect electrical ports may be used for removal and/or expansion of chassis/modules. Internal switches may also be used to bring the battery in connection with the vehicle components (e.g., power electronics for M/G, vehicle charger, or electrical network for passenger compartment). The switches may also be used for connecting chassis/modules when being used in the stationary application. Lastly, the switches may be used for bypassing a given chassis/module when inter-connected in a series fashion.

Lastly, each battery pack or Electric Energy Storage (ESS) device (e.g., battery 22) may include an individual converter such that the battery pack/ESS may be connected to either an AC or DC power bus. An additional converter may be used for connecting the overall battery pack/ESS to an external AC power-grid. It is contemplated that the separate converters may be used to split the tasks to improve efficiency gains for the system.

For instance, a power bus may be operating at ~400 VAC. Also, the input voltage for individual DC/AC inverters may only vary ~100V and can be designed to work at peak efficiency for that input range. It is therefore contemplated that to feed the energy to an external grid, a transformer may be required to transform the 400V AC to a different voltage (e.g., 11 kV or higher).

Lastly, it is contemplated that the power bus may also be the high-voltage DC bus in which case individual DC/DC boosters may be used for connecting the packs to the power bus. A DC/AC transformer may then to convert low voltage DC to low voltage AC to the external grid level AC voltage.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. An electric vehicle (EV) chassis, comprising:
a high-voltage battery having;
at least one power port, the at least one power port being connected to the high-voltage battery, the at least one power port being operable to be connected to an external power port located on a second EV chassis, wherein the external power port is connected to an external high-voltage battery within the second EV chassis; and
at least one communication port, the at least one communication port being operable to transmit data that includes operating characteristics of the high-voltage battery and the external high-voltage battery with an external communication port located on the second EV chassis; and
a controller operable to:
responsive to the at least one power port being connected to the external power port, control an electrical energy transferred between the at least one power port and the external power port to generate a combined, direct-current (DC), electrical energy output that is operably provided to an external source; and
responsive to the at least one communication port being connected to the external communication port, transmit the data between the at least one communication port and the external communication port to control generation of the combined, DC, electrical energy output.

2. The EV chassis of claim 1, wherein the at least one power port includes a male connector and the external power port includes a female connector.

3. The EV chassis of claim 1, wherein the at least one power port includes a female receptacle and the external power port includes a male connector.

4. The EV chassis of claim 1, wherein the EV chassis includes at least one switch and the second EV chassis includes an external switch.

5. The EV chassis of claim 4, further comprising: responsive to the at least one power port being connected to the external power port, the controller operating the at least one switch and the external switch to create a series connection between the high-voltage battery of the EV chassis and the external high-voltage battery.

6. The EV chassis of claim 4, further comprising: responsive to the at least one power port being connected to the external power port, the controller operating the at least one switch and the external switch to bypass the electrical energy from being transferred between the high-voltage battery of the EV chassis and the external high-voltage battery.

7. The EV chassis of claim 4, further comprising: responsive to the at least one power port being connected to the external power port, the controller operating the switch and the external switch to produce an alternating current (AC) energy output.

8. The EV chassis of claim 1, further comprising: responsive to the at least one power port being connected to the external power port, the controller operating a parallel connection between the high-voltage battery of the EV chassis and the external high-voltage battery.

9. The EV chassis of claim 8, wherein a high-voltage bus operably connects the at least one power port to the external power port.

10. The EV chassis of claim 1, further comprising: a support sheet that includes a support power port and a support communication port, wherein a lower portion of the support sheet is operable to be mechanically fastened to the EV chassis, and the support power port and the support communication port are electrically connected to the at least one power port and the at least one communication port.

11. The EV chassis of claim 10, wherein an upper portion of the support sheet is mechanically fastened to the second EV chassis, and the support power port and the support communication port are electrically connected to the external power port and the external communication port.

12. The EV chassis of claim 1, further comprising: responsive to the at least one power port being connected to the external power port, the controller further being operable to measure at least one operating characteristic of the high-voltage battery and the external high-voltage battery.

13. The EV chassis of claim 12, wherein the controller is further operable to control operation of the high-voltage battery and the external high-voltage battery.

14. The EV chassis of claim 12, further comprising: a trans-receiver, wherein the controller is further operable to transmit the at least one operating characteristic to a remote server.

15. The EV chassis of claim 12, wherein the controller is further operable to generate a warning when the at least one operating characteristic exceed a predefined threshold.

16. The EV chassis of claim 1, wherein the controller is operable to receive software code from a remote server, wherein the software code determines how the electrical energy is transferred between the at least one power port and the external power port and how the data is transferred between the at least one communication port and the external communication port.

17. A method for connecting a first electric vehicle (EV) chassis with a second EV chassis, comprising:

electrically connecting at least one power port located on the first EV chassis to an external power port located on the second EV chassis, wherein the at least one power port is connected to a high-voltage battery within the first EV chassis and the external power port is electrically to an external high-voltage battery within the second EV chassis;

electrically connecting at least one communication port located on the first EV chassis with an external communication port located on the second EV chassis, wherein the at least one communication port is operable to transmit data that includes operating characteristics of the high-voltage battery and the external high-voltage battery with the external communication port located on the second EV chassis;

controlling direct current (DC) electrical energy transferred between the at least one power port and the external power port to generate a combined DC electrical energy output that is operably provided to an external source responsive to the at least one power port being connected to the external power port; and transmitting the data transferred between the at least one communication port and the external communication port to control generation of the combined DC electrical energy output responsive to the at least one communication port being connected to the external communication port.

18. The method of claim 17, further comprising: operating at least one switch included within the EV chassis and an external switch located within the second EV chassis to create a series connection between the high-voltage battery of the EV chassis and the external high-voltage battery responsive to the at least one power port being connected to the external power port.

19. The method of claim 17, further comprising operating the high-voltage battery of the EV chassis and the external high-voltage battery using a parallel connection.

20. An electric vehicle (EV) chassis, comprising:

a direct current (DC) energy storage system operable to be mechanically and electrically removed from the EV chassis, the energy storage system including a high-voltage battery, at least one power port connected with the high-voltage battery, at least one communication port, and a controller;

responsive to the DC energy storage system being mechanically and electrically removed from the EV chassis:

the at least one power port is operable to be electrically connected to an external power port located on a second EV chassis, wherein the external power port is connected to an external high-voltage battery within the second EV chassis;

the at least one communication port is operable to be connected and transmit data that includes operating characteristics of the high-voltage batter and the external high-voltage battery with an external communication port located on the second EV chassis; and the controller being operable to:

responsive to the at least one power port being connected to the external power port, control DC electrical energy transferred between the at least one power port and the external power port to generate a combined DC electrical energy output that is operably provided to an external source; and responsive to the at least one communication port being connected to the external communication port, transmit the data between the at least one communication port and the external communication port to control generation of the combined DC electrical energy output.

\* \* \* \* \*

UNITED STATES PATENT AND TRADEMARK OFFICE
CERTIFICATE OF CORRECTION

| | |
|---|---|
| PATENT NO. | : 11,912,151 B2 |
| APPLICATION NO. | : 16/944619 |
| DATED | : February 27, 2024 |
| INVENTOR(S) | : John Christensen et al. |

It is certified that error appears in the above-identified patent and that said Letters Patent is hereby corrected as shown below:

In the Claims

Column 16, Lines 5-6, Claim 17:
After "and the external power port is electrically"
Insert -- connected --.

Column 16, Lines 55-56, Claim 20:
After "operating characteristics of the high-voltage"
Delete "batter" and
Insert -- battery --.

Signed and Sealed this
Fifteenth Day of October, 2024

Katherine Kelly Vidal
*Director of the United States Patent and Trademark Office*